Dec. 9, 1969  H. V. NORDHOLM, JR  3,482,486
REDUNDANT CONTROL METHOD AND APPARATUS
Filed Nov. 29, 1967  2 Sheets-Sheet 1

INVENTOR
HERBERT V. NORDHOLM, JR.
BY John C. Lindeman
AGENT

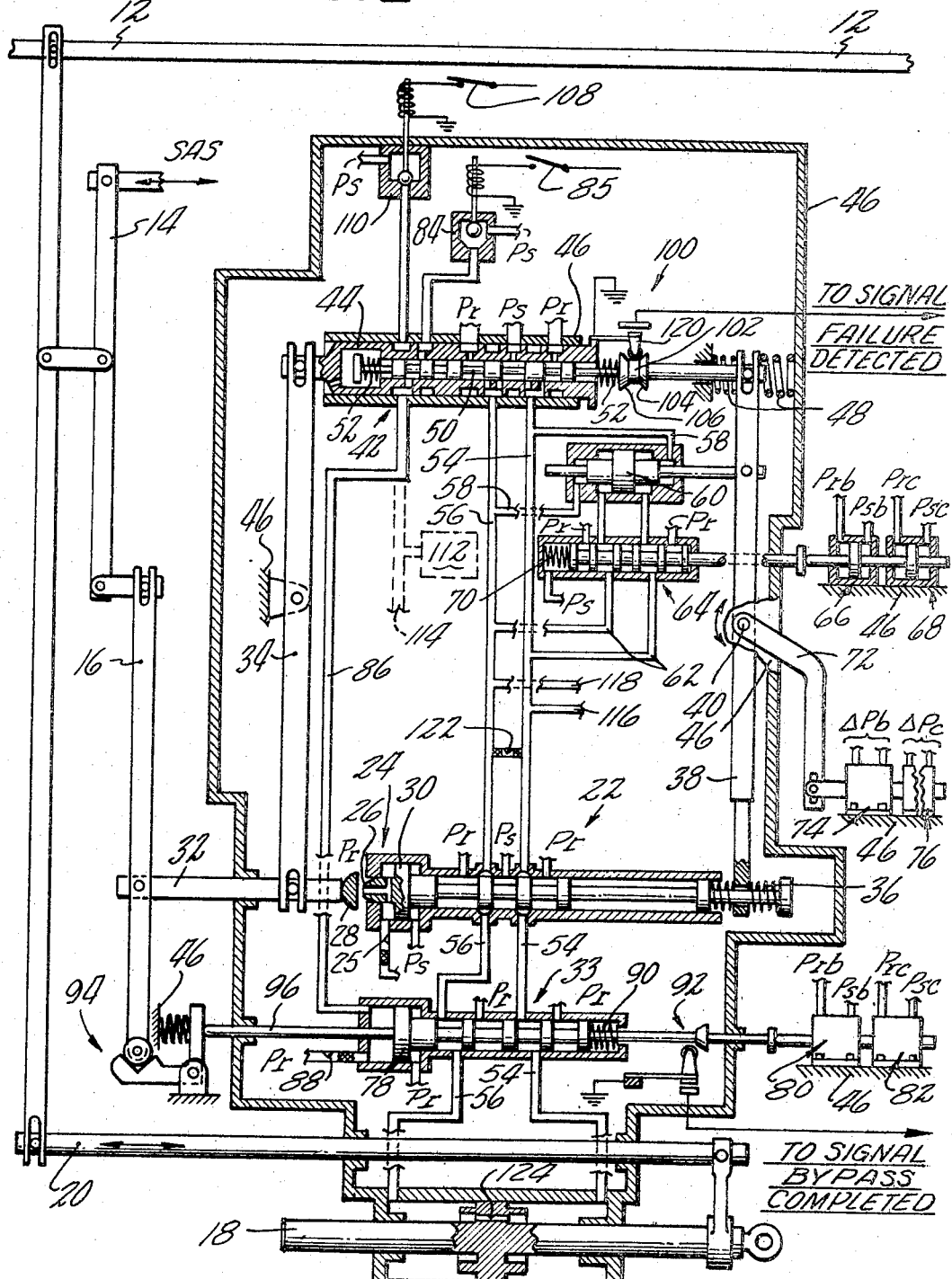

United States Patent Office 3,482,486
Patented Dec. 9, 1969

3,482,486
REDUNDANT CONTROL METHOD AND APPARATUS
Herbert V. Nordholm, Jr., Simsbury, Conn., assignor to United Aircraft Corporation, East Hartford, Conn., a corporation of Delaware
Filed Nov. 29, 1967, Ser. No. 686,659
Int. Cl. F15b 11/16, 13/06; F01b 25/26
U.S. Cl. 91—411                                          22 Claims

ABSTRACT OF THE DISCLOSURE

This disclosure relates to redundant control systems in which parallel actuators operate a common control with the control load shared among the actuators. Each actuator has provisions for failure detection. Failure detection is performed in conjunction with load sharing and continues as long as there are two operative actuators. The control mechanism remains operational as long as any one actuator is operative.

Background of the invention

This invention relates to redundant servo mechanisms which include provisions for load sharing among the redundant channels and self-detection of failures in errant channels. The application is related generally to application Ser. No. 686,658, filed Nov. 29, 1967, by Sherman et al., having the same assignee.

Much art has recently emerged in the field or redundant servo mechanisms, especially in aircraft control systems, due to emphasis on safety. In some approaches, partially redundant systems include a plurality of fluid control valves in which the fluids from the respective control valves feed a common fluid motor. Such systems are shown in U.S. Patents Nos. 3,219,295 and 3,257,911. These systems provide a limited degree of redundancy and rely upon an averaging of the command signals driving the fluid motor to avoid complete failure. In more sophisticated redundant servo mechanisms, full redundancy exists by duplicating both the fluid control valves and fluid motor as shown in U.S. Patent No. 3,270,623. In these systems, an additional feature is often included which permits self-determination of a malfunction and switching from an active channel to a standby channel. The criteria for failure is usually an arbitrary control condition which would not normally occur in the absence of a failure, e.g., a high control pressure. These systems are referred to sometimes as "on-off" systems in view of the fact that during normal operation one of the channels is "on" and the other of the channels is "off."

Still other systems such as shown in U.S. Patents Nos. 3,338,138 and 3,338,139 operate "on-on" which means that a number of the redundant, parallel channels operate simultaneously. With such systems, however, it is desirable to incorporate some means for sharing the loads between the active channels so that one of the servos is not overloaded. Maximum response is derived from all of the active channels operating cooperatively.

Summary of the invention

It is desirable to have redundant servo mechanism in which the load can be shared at all times in equal proportions among the active channels of the redundant mechanism. This is accomplished in the present application by means of a balancing linkage within each of the actuators which provides an error signal to the input of the actuator to correct any load deviations of the channel from the average of the loads carried by all of the active channels. This insures that each channel will be operating with maximum response in cooperation with the rest of the channels. With a balancing linkage in each of the actuators, it is possible to eliminate all mechanical interconnections between the actuators and substittue hydraulic connections therefor. With the hydraulic interconnections only, no locking arrangement such as disclosed in the above-mentioned application of Sherman et al. is necessary to lock out remote inputs to the load sharing linkage when a failure has occurred.

It is also desirable where a plurality of redundant channels exists to have a failure detection apparatus incorporated within each channel so that an errant channel can be recognized and operatively removed from the system. An errant actuator, even though shut off, may interfere with the performance of the rest of the channels. Failure detection in this invention is performed in conjunction with the load sharing linkage. The linkage has a resiliently centered position at a balanced load condition and displacements of the linkage from the centered position are a measure of the load deviation of the channel containing that load sharing linkage. A prescribed limit on the displacement of the linkage is established corresponding to a permissible load tolerance and displacements in excess of the prescribed tolerance trigger a failure signal.

The failure criterion is an excessive deviation of an errant channel from the mean or average control load of the operative channel. Using the average load for failure detection normally requires at least three operative channels to derive a reliable average from which the failured channel can be discerned. This is called a majority logic system.

In order to detect and identify a failed channel when there are only two operative outputs, a polarity reference from the input command member of the servo is provided. The polarity input shifts the center position of the load sharing linkage in one direction or the other depending upon the phase, or polarity, or sense of the input signal. This shift effectively biases the load tolerance at which failure occurs. In contrast to earlier majority logic systems, this input permits two operative channels alone to continue load sharing after a third channel has failed. This input also provides the third quantity for determining which one of the two operative channels has failed when the load differential exceeds the prescribed tolerance. The failure criteria is that the one of the two channels which responds the least to the command member will be shut off to allow the single remaining channel and the system to continue operating.

Brief description of the drawings

FIG. 2 is a detailed view of one of the servo actuators including the power boost cylinder.

Description of the preferred embodiments

Figure 1:
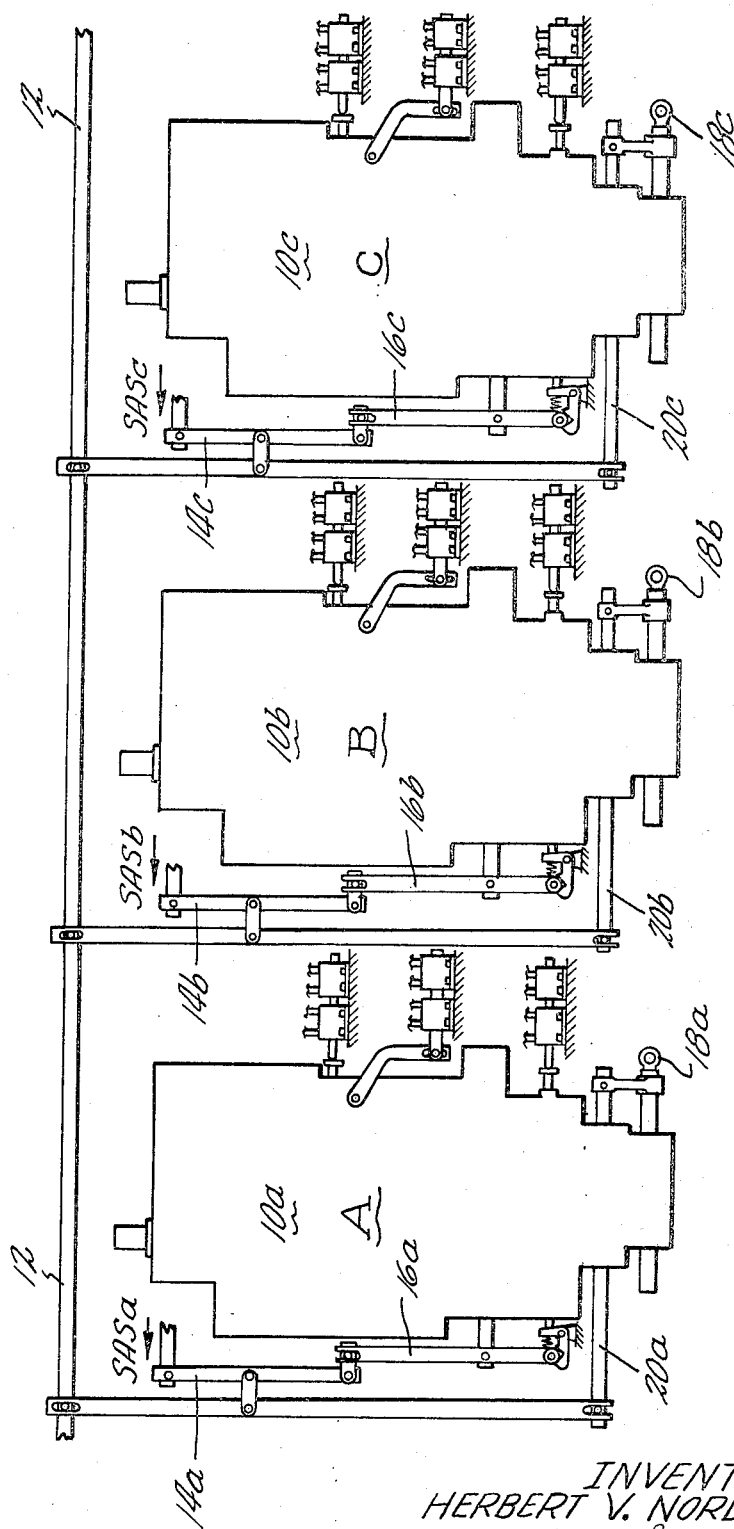
FIG. 1 shows three redundant control channels A, B, and C, including servo actuators and power boost cylinders which may be connected to a common control to operate the control in parallel.

Reference to FIG. 1 discloses a typical configuration of a plurality of redundant servo mechanisms operating in parallel. While the servo mechanisms may be employed in any control system where redundancy is desired, the embodiments will be described with respect to a power-boosted control system of an aircraft. Each of the actuators 10 is fluid powered, and in order to retain full redundancy, it is preferable that a separate power supply be provided for each actuator. Each actuator 10 has the same components and is connected to a pilot's control stick through an input command linkage 12. Corresponding components in different channels will be distinguished by subscript (a) relating to channel A, (b) relating to channel B, etc. The input from the pilot's control may be added differentially with a triplicated Stability Augmentation System connected to differential link 14. The inputs from the pilot's control and the Stability Augmentation System are summed by the differential link 14 and introduced through lever 16 into the actuator 10. The output of each actuator is derived from power boost pistons 18, each of which would be connected to a common control surface so that the pistons will operate in parallel. Position feedback linkage 20 is connected between the power boost piston 18 and the input command linkage 12.

FIG. 2 shows the detailed construction of one of the actuators 10 shown in FIG. 1, e.g. channel A. The input from lever 16 to the actuator is connected to a main spool valve 22 through a link 32 and a dog drive valve 24. The dog valve 24 effectively is a high force gain device to move the main spool. Hydraulic fluid at supply pressure $P_s$ passes into the dog valve 24 across a fixed orifice 25 and through a variable orifice formed between knife edge 26 and a control flapper 28. System pressure $P_s$ on the right-hand side of piston 30, as seen in FIG. 2, and a control pressure on the left-hand side of piston 30 cause the main spool to follow the displacements of link 32 precisely. Movements of the main spool valve 22 meter hydraulic fluid through bypass valve 33 to control the position of power boost piston 18.

Connected to the link 32 is a link 34 pivotally mounted to the housing 46 of the actuator. Connected to the right-hand end of the main spool valve 22 through springs 36 is a load sharing link 38 pivotally mounted to the actuator housing 46 by a jackshaft 40. The upper ends of the link 34 and the load sharing link 38 are connected to a vernier valve 42. The link 34, which normally lies parallel to the load sharing link 38, connects with a movable sleeve 44 of the valve 42. The load sharing link 38 is connected to the spool 50 of the valve 42 and is resiliently connected to the actuator housing 46 by polarity springs 48. Backlash springs 52 are positioned between the movable sleeve 44 and spool 50.

Control pressure ducts 54 and 56 which lead to opposite sides of the power boost piston 18 also communicate with the vernier valve control ports as long as the ports in the by-pass valve 33 are open as shown, and in spite of the position of the main spool in valve 22. Pressure ducts 58 leading from the control ducts 54 and 56 connect to one pair of pressure areas on double-area piston 60. Another set of ducts 62 connect the control ducts 54 and 56 to the second pair of pressure areas of the double-area piston 60. Each of the pairs of pressure areas of the piston 60 are equal. Interposed in the ducts 62 is a shuttle valve 64 which, in the position shown, communicates ducts 62 with the one pair of the pressure areas of piston 60 and in its bypass position drains the fluid on the one pair of areas to return pressure $P_r$. Connected to the shuttle valve 64 are a pair of hydraulic piston and cylinder assemblies 66 and 68. These assemblies operate under system pressures $P_{sb}$ and $P_{sc}$ from ports 114b and 114c in channels B and C, respectively, and oppose the forces of spring 70 and system pressure $P_{sa}$ in channel A. The return pressures $P_{rb}$ and $P_{rc}$ are also connected to the assemblies from the remote channels. These pressures actuate the shuttle valve 64 between its two positions as described in greater detail below. The assemblies are shown mounted to the actuator housing 46a in channel A to permit the different channels to be interconnected hydraulically. When so mounted, separate cylinder housings for the assemblies are provided to maintain a separation of the different hydraulic systems in the event of a structural or seal failure of one actuator housing. Alternately, the assemblies 66 and 68 could be remotely located in the other actuator channels and mechanical interconnections could be employed.

Connected to one end of jackshaft 40, which projects outside of the actuator housing 46, is a load sharing arm 72. Connected to the lower end of arm 72 are another pair of hydraulic piston and cylinder assemblies 74 and 76, similar in construction and mounting to assemblies 66 and 68. The pressure differentials, $\Delta P_b$ and $\Delta P_c$, across the output pistons 18b and 18c of channels B and C are taken from ports 116b, 118b and 116c, 118c and applied to the assemblies 74 and 76 respectively. The manner in which the hydraulic assemblies 74 and 76 cooperate with the actuator to provide load sharing is described in greater detail below.

The bypass valve 33 which permits control pressure ducts 54 and 56 to communicate with the hydraulic power boost piston 18 is actuated by piston 78 and hydraulic piston and cylinder assemblies 80 and 82 similar in construction and mounting to assemblies 66 and 68. System pressure $P_s$ from solenoid-type shutoff valve 84 controlled by pilot's switch 85 is normally transmitted by vernier valve 42 and duct 86 to the left-hand side of piston 78. Under normal operating conditions, an orifice 88 maintains a sufficient pressure against the left-hand side of piston 78 to hold the bypass valve 33 in the position shown for passing hydraulic fluid from the main control valve 22 and vernier valve 42 to the piston 18. Opposing the force generated by piston 78 are a spring 90 and the hydraulic assemblies 80 and 82. The assemblies 80 and 82 are supplied by system pressures $P_{sb}$ and $P_{sc}$ from channels B and C respectively to bias the valve 33 toward its bypass position. In the bypass position, fluid on both sides of the piston 18 is drained to pressure return $P_r$. The sizing of the piston 78 and assemblies 80 and 82 is such that supply pressure against piston 78 will hold the bypass valve 33 in the position shown against the spring 90 and both of the supply pressures $P_{sb}$ and $P_{sc}$. In the event that a failure occurs in channel A, the pilot may shut off the pressure to channel A with switch 85 and valve 84. With pressure off, spring 90 and either of the assemblies 80 and 82 can force the valve 33 to its bypass position. The spring 90 and the assemblies 80 and 82 are all redundant when operative. It should be noted, however, that in the event channel A is the second of the three channels (A, B, C) to fail, in which case one of the assemblies 80 or 82 will have been depressurized, the other of the assemblies must actuate the bypass valve 33 by itself. The switch 92 is closed by the actuation of the bypass valve 33 and generates a signal indicating that the channel is in bypass.

In the event that the failure of a channel is caused by a jammed dog valve 24 or main spool valve 22, it is desirable that the input lever 16 be freed to prevent binding of the input lever 12 and the link 14. For this reason, a spring biased latch 94 serves as a releasable pivot point for lever 16. The latch 94 is released by a rod 96 from the bypass valve to operatively disengage the input lever 16 from the actuator. Together, the bypass valve 33, and the latch 94 will disengage both the input elements and the output elements from the actuator in the event of a failure in the actuator.

Load sharing

Since this actuator may operate in parallel with a number of coacting actuators, provisions are included for detecting the deviations of the loads of the respective power pistons 18 from the average load carried by the power pistons 18. The measuring instruments for detecting these load deviations include primarily the load sharing link 38, the double-area piston 60 and the piston and cylinder assemblies 74 and 76 which sense $\Delta P$'s of the other channels.

When three channels are in operation, the shuttle valve 64 is positioned as shown so that both pairs of areas on piston 60 are exposed to the control pressures on piston 18 through control ducts 54 and 56, and ducts 58 and 62. The assembly 74 is connected to the control ducts in channel B while the assembly 76 is connected to the control ducts in channel C. The proportional forces of $\Delta P_b$ and $\Delta P_c$ on the transducers 74 and 76 will be opposed through the interconnecting arm 72, jackshaft 40, and load sharing link 38 by the proportional force of $\Delta P_a$ on the double-area piston 60. If the loads on the power pistons 18 of all three channels are the same, the moments produced by the proportional forces on link 38 will be balanced and the link 38 will remain in its center position established by springs 36 and 48. If, however, there is a deviation in any of the control loads carried by the power pistons 18, the lever 38 will be displaced an amount proportional to the deviation and will compress the springs 36 and 48. When the upper end of the load sharing link 38 displaces, it also moves the spool 50 of vernier valve 42 and hydraulic pressure will be metered through ducts 54 and 56 to the power pistons 18 to increase or decrease the loads across the pistons and eliminate the deviations of the piston loads from the average.

In the event that one of the channels B and C has failed, one of the load transducers 74 or 76 will have been placed in bypass along with its corresponding power piston. Since the force applied to the load sharing link 38 will be reduced by the loss of one of the channels, the total effective area of the double-area piston must be reduced to maintain the same balancing gains. In order to reduce the effective area of piston 60, the shuttle valve 64 is actuated by spring 70 and $P_{sa}$ to its bypass position when either supply, $P_{sb}$ or $P_{sc}$, is removed from the errant channel. The valve 64 thus cuts off the ducts 54 and 56 from the piston 60 and drains fluid to return pressure $P_r$.

It will be recognized that any number of actuators can be connected to operate in parallel. For each actuator connected to the load sharing arm 72, a corresponding piston and shuttle valve must be connected to the load sharing link 38 to operate in series with the piston 60. Each time one of the other channels fails, the effective area of all of the pistons 60 must be reduced by a corresponding amount. For example, to balance the load sharing link 38 if there are $n$ channels operating with the actuator shown in FIG. 2, the actuator must have $n$ paired areas equivalent to one of the paired of areas on the double piston 60. Each time a channel fails and is placed in bypass, the paired areas must be reduced to $n-1$.

It will be noted that with an individual load sharing link in each actuator, no lock is necessary as in the above-referenced application to Sherman et al. for disengaging the load sharing apparatus from other operative channels after failure. No mechanical connection between channels is necessary and as soon as a failed channel is placed in bypass, the corresponding $\Delta P$ assemblies in the active channels are operatively removed from the load sharing apparatus.

Failure detection

Failure detection is incorporated with the load sharing mechanism. A switch 100 is actuated by a trigger 102 having flanges 104 and 106 at each end. When the input lever 16 is in its null position, the relative displacement of the spool 50 and sleeve 44 is a measure of the load deviation. Whenever the relative displacement of the sleeve and spool exceeds a given amount, the flange 104 or 106 will close the switch 100 and signal a failure detected. The flanges 104 and 106, therefore, represent a preselected load tolerance within which the control loads should remain in the absence of any failures. The flanges represent the upper and lower limits of the permitted load deviation.

Supply pressure $P_s$ from shutoff valve 84 passes through the left-hand ports of the vernier valve 42 to hold the bypass valve 33 in its "channel-operative" position. In the event that the preselected load tolerance is exceeded by a large amount, it may be desirable to have an automatic shutoff of the failed channel. With very large displacements of the spool 50 and sleeve 44, the supply pressure from shutoff valve 84 will be automatically cut off by the spool 50 and bypass valve 33 together with the release 94 will be actuated to their failed positions. Alternatively, the automatic cut off could occur at the same time that switch 100 closes and switch 92 could produce a failure signal redundantly with switch 100.

If the pilot wishes to continue operation with the actuator in spite of a failure, a manual override switch 108 may be opened to open solenoid valve 110 and reestablish pressure in duct 86 which holds piston 78 and bypass valve 33 in the "channel-operative" position. Pressure switch 112 connected to conduit 86 may be provided to indicate to the pilot that the channel cut off has been overridden.

Failure detection with two operative outputs

It is a primary feature of this invention that a failure can be discerned between two operative output pistons 18. The primary failure criterion again is a deviation of the control loads on the two operative output pistons by the prescribed tolerance. Since the deviations inherently will be both above and below the average load by equal amounts, an additional criterion for failure is necessary. The additional criterion is that the channel responding the least to the command input signal is the failed channel. In order to discern the failed channel, an initial displacement of the trigger 102 and switch contact 120, is provided by the input lever 16 through rod 32, the main spool valve 22, the springs 36 and 48 and the load sharing lever 38. This initial displacement by lever 16 biases the trigger flanges 104 and 106 so that one flange is closer to the contact 120 even though the loads are balanced in the operational channels. If unbalanced loads of the operating output pistons 18 cause a further displacement of the trigger 102, the flange 104 or 106 will trip the failure switch 100 in one operating channel before the opposite flange, 106 or 104 respectively, trips the failure switch 100 in the other operating channel. The initial displacement of the trigger 102 with respect to the contact 120 is phased with the lever 16 so that the flange 104 or 106 representing lower tolerance will always be displaced closer to the contact 120. It should be recognized that the upper and lower limits represented by the flanges 104 and 106 reverse between the flanges with the polarity of the input error command represented by right or left displacements from null of lever 16 and main spool valve 22 in FIG. 2. The right or left bias of the trigger 102 with respect to the contact 120 generated by the input command is in phase with or has the same sense as the input command but always moves the upper limit flange away from the switch contact 120 because of the reversal of the limits between flanges.

In a second embodiment of the actuator, the same initial bias between the trigger 102 and contact 120 can be established by eliminating the polarity springs 48 and mounting the contact 120 directly to the actuator housing 46 near the vernier valve 42. In this configuration, the initial displacement of the lever 16, and load sharing lever 38 will establish a relative displacement of the contact 120 and trigger 102 without the relative displacement of the sleeve 44 and vernier spool 50 generated by the polarity springs 48 in the previously described embodiment. In this case, any displacement of the spool and sleeve will be due solely to load deviations and consequently the spool and sleeve will remain in their closed position when the control loads are balanced. In order to bias the upper limit flange away from contact 120 rather than the lower limit flange, it is necessary in this embodiment to reverse the supply pressure and return ports at the vernier valve 42 and the connections of ducts 58 and 62 with the control pressure ducts 54 and 56. Corresponding reversals of the $\Delta P$ connections to the assemblies 74 and 76 would, of course, also be necessary.

In still a third embodiment, the actuator shown in FIG. 2 could be modified by removing springs 36 and the connection of load sharing lever 38 to the main spool of valve 22. In this embodiment, the initial displacement of input lever 16 translates sleeve 44 and the switch contact 120 through link 34. The operation of this embodiment is essentially the same as the configuration shown in FIG. 2. Another advantage of this third embodiment is the possibility of eliminating the dog drive valve 24. The dog drive valve 24 normally prevents the loads in spring 36 from feeding back to the pilot's control rod 12 and the stability augmentation input whenever unequal loads exist on the power output pistons 18. No loads are reacted between the lever 38 and the main spool without their interconnection, and the high force multiplication of the input command by the dog drive valve 24 is not necessary.

Although practically all spool valves have a prescribed leakage rate which requires that they operate off center when they are generating a control load at the power piston 18, it may be desirable to have the lands of the main spool valve 22 underlapped to insure that a significant displacement of the main spool from its centered position is held. Such a displacement of the spool ensures that the corresponding displacement of the trigger 102 will be large enough to establish a substantial bias of the trigger 102 for failure detection when only two channels are operating. Alternatively damping orifice 122 between control pressure ducts 54 and 56 or the damping orifice 124 in piston 18 may provide the same effect as the underlapped valve.

Since it is possible that a large load deviation resulting from the complete failure of one actuator will trip the switches 100 in all of the operating channels, it may be desirable to incorporate a lock-out device in the electrical failure signal circuits so that only the first signal from switches 100 in all of the operating channels, it may be channel. Once the failed channel has been eliminated the lock-out could be reset for a subsequent failure.

It should be understood that the invention is not limited to the particular embodiments shown and described herein, but that various changes and modifications may be made without departing from the spirit or scope of this novel concept as defined by the following claims.

I claim:
1. An actuator for a control device having an input command element and two redundant load-carrying output elements comprising:
  (a) means for distributing the control loads between the two output elements in preselected proportions; and
  (b) means for identifying a failure in one of the output elements in response to load deviations from the preselected proportions in excess of a prescribed load tolerance and a signal representative of the polarity of the input command.

2. The actuator of claim 1 wherein the means for distributing includes:
  (a) load transducers operatively connected with the output elements for producing a force proportional to the control loads of the output elements;
  (b) a force balancing linkage connected with the load transducers and having a balanced, resiliently held center position corresponding to a load distribution of the preselected proportions on the output elements; and
  (c) differential means connected to both the input command element and the force balancing linkage for controlling the respective output elements in response to the input command and deviations of force balancing linkage from the center position.

3. The actuator of claim 2 for a control device having fluid-actuated output elements wherein the differential means includes a primary fluid control valve responsive to the input command element and a vernier fluid control valve responsible to the force balancing linkage.

4. The actuator of claim 2 wherein the input command element is resiliently connected to the force balancing linkage to effectively bias the resiliently held center position.

5. The actuator of claim 2 for a control device having output elements actuated by fluid pressure differentials wherein the load transducers are piston and cylinder assemblies hydraulically connected to the output elements and responsive to the fluid pressure differentials.

6. In a redundant servo control mechanism having a plurality of output members coupled to a common control for parallel operation in response to an input command signal, the improvement comprising:
  (a) detection means connected to the output members for measuring load deviations of the output members from a prescribed load distribution;
  (b) signal means connected with the detection means for generating a failure signal upon a preselected load deviation measured by detection means; and
  (c) means operatively connected with the signal means for effectively biasing the preselected load deviation in response to the input command signal.

7. The improvement of claim 6 wherein the last-named means biases the preselected deviation in phase with the command signal.

8. In a redundant control system having at least one input command element and a plurality of output elements for operating a common control in parallel, apparatus comprising:
  (a) balancing means connected between the output elements and the input element for sharing control loads between the operative output elements;
  (b) first failure detection means connected to the balancing means for signalling a failure of one of at least three operative output elements in response to a deviation of the control loads of the operative output elements in excess of a prescribed tolerance; and
  (c) second failure detection means connected with the balancing means for identifying a failure in one of two operative output elements in response to a prescribed deviation of the control loads of the two operative output elements and the polarity of the input command.

9. Apparatus according to claim 8 including means for operatively disengaging a failed output element from the operative output elements and the balancing means.

10. Apparatus according to claim 9 further including means for operatively disengaging the input command element from the failed output element.

11. Apparatus according to claim 8 wherein the balancing means includes a force balance comprising:
  (a) a load transducing means sensitive to the control load of one of the operative output elements for producing an output force proportional to $n$ times the control load of the one of the operative output element;
  (b) a combination of $n$ load transducers sensitive to the control loads of other of the operative output elements, each transducer in series with the others and producing a force proportional to the respective control loads of the other of the operative output elements; and
  (c) the load transducing means being connected in force opposing relationship to the combination of $n$ load transducers in series.

12. Apparatus according to claim 11 including means connected to the load transducing means for reducing the output force to a force proportional to $(n-1)$ times the control load each time one of the other operative output elements fails.

13. Apparatus for a redundant control mechanism having an input command member and two coacting output members comprising:
  (a) load sensors having input connections for the coacting output members to measure the respective control loads of the members;
  (b) a comparator operatively connected with the sensors for manifesting the deviations of the control loads from one another; and (c) a least error detector operatively connected with the comparator and the input command member for signalling a deviation of the control loads beyond a preselected tolerance and identifying the one of the output members having the smaller response to the input command member.

14. The apparatus of claim 13 further including a differential controller connected between the input member and one of the coacting output members to drive the one of the output members, the controller being additionally connected with the comparator to balance the control loads of the output members in response to the deviations manifested by the comparator.

15. Apparatus for identifying a failure in a system having an input and two redundant, continuously responding outputs comprising:
  means for comparing the two outputs to determine the difference of the two outputs;
  means for comparing the difference with a preselected tolerance;
  means for comparing the outputs to the input; and
  means for signalling a failure of the output responding the least to the input when the difference exceeds the preselected tolerance.

16. The apparatus of claim 15 in which the outputs are disengageable load-carrying elements and the difference represents the difference in the loads carried by the outputs further including:
  means for disengaging the failed load-carrying element in response to the failure signal.

17. A method of detecting and identifying a failure of one of two redundant output manifestations generated in a system in response to an imput manifestation comprising:
  comparing the two output manifestations to determine the magnitude of the difference of the two output manifestations;
  comparing the magnitude of the difference with a preselected tolerance;
  comparing the output manifestations with the input manifestation; and
  signaling a failure of the output manifestation responding the last to the input manifestation when the magnitude of the difference exceeds the tolerance.

18. A method of detecting and identifying a failure in a system having a signal input and first and second continuously responding, redundant outputs comprising:
  comparing the two outputs to determine the magnitude and sense of the difference of the second output from the first output;
  comparing the magnitude of the difference with a preselected tolerance;
  comparing the sense of the difference with the sense of the command input;
  signalling a failure of the second output when the magnitude of the difference exceeds the tolerance and the sense of the difference is the same as the sense of the input; and
  signalling a failure of the first output when the magnitude of the difference exceeds the tolerance and the sense of the difference is opposite to the sense of the input.

19. The method of claim 18 when the output can be disabled from the system further including the step of disabling the failed output.

20. Method of claim 19 when the outputs are disengageable, load-carrying elements wherein the disabling is accomplished by disengagement of the output elements from the system.

21. A method of detecting failures in a redundant system having an input and a plurality of the redundant outputs in parallel association, comprising:
  comparing each of the operative outputs with the other operative outputs to determine an average of the outputs;
  comparing each of the operative outputs with the average of the outputs to determine the respective output deviations from the average of the outputs; and
  disassociating each output having a deviation which exceeds the limits of a prescribed tolerance, the limits of the prescribed tolerance being biased about the average of the outputs by the input.

22. The method of claim 21 wherein the limits of the prescribed tolerance are biased in the same sense as the input.

References Cited

UNITED STATES PATENTS

| | | | |
|---|---|---|---|
| 3,095,783 | 7/1963 | Flindt | 244—77 XR |
| 3,190,185 | 6/1965 | Rasmussen. | |
| 3,286,600 | 11/1966 | Colburn | 91—1 XR |
| 3,358,565 | 12/1967 | Townsend | 91—411 |
| 2,353,389 | 7/1944 | Cannon. | |
| 3,391,611 | 7/1968 | Jenney | 91—411 XR |
| 3,401,600 | 9/1968 | Wood | 91—411 XR |
| 3,411,410 | 11/1968 | Westbury et al. | 91—411 XR |

EDGAR W. GEOGHEGAN, Primary Examiner

U.S. Cl. X.R.

91—1, 412; 244—76

PO-1050
(5/69)

UNITED STATES PATENT OFFICE
CERTIFICATE OF CORRECTION

Patent No. 3,482,486     Dated December 9, 1969

Inventor(s) H. V. Nordholm, Jr.

It is certified that error appears in the above-identified patent and that said Letters Patent are hereby corrected as shown below:

In column 7, Claim 3, line 70, "responsible" should read --responsive--

In column 9, Claim 17, line 33, "imput" should read --input--

In column 9, Claim 17, line 43, "last" should read --least--

SIGNED AND SEALED
APR 28 1970

(SEAL)
Attest:

Edward M. Fletcher, Jr.
Attesting Officer

WILLIAM E. SCHUYLER, JR.
Commissioner of Patents